(12) United States Patent
Figov et al.

(10) Patent No.: US 11,755,643 B2
(45) Date of Patent: Sep. 12, 2023

(54) METADATA GENERATION FOR VIDEO INDEXING

(71) Applicant: Microsoft Technology Licensing, LLC, Redmond, WA (US)

(72) Inventors: Zvi Figov, Modiin (IL); Irit Ofer, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 481 days.

(21) Appl. No.: 16/921,248

(22) Filed: Jul. 6, 2020

(65) Prior Publication Data

US 2022/0004574 A1    Jan. 6, 2022

(51) Int. Cl.

| G06F 16/00 | (2019.01) |
| --- | --- |
| G06F 16/71 | (2019.01) |
| G06F 16/783 | (2019.01) |
| G06V 10/25 | (2022.01) |
| G06V 20/40 | (2022.01) |

(52) U.S. Cl.
CPC .......... G06F 16/71 (2019.01); G06F 16/7837 (2019.01); G06V 10/25 (2022.01); G06V 20/41 (2022.01); G06V 20/48 (2022.01)

(58) Field of Classification Search
CPC ... G06F 16/71; G06F 16/7837; G06K 9/3233; G06K 9/00718
See application file for complete search history.

(56) References Cited

U.S. PATENT DOCUMENTS

| 7,312,819 | B2 | 12/2007 | Ma et al. | |
| --- | --- | --- | --- | --- |
| 8,285,045 | B2 | 10/2012 | Kim et al. | |
| 8,867,892 | B2 | 10/2014 | Li et al. | |
| 9,064,385 | B2 | 6/2015 | Saboune et al. | |
| 9,576,221 | B2 | 2/2017 | Mayle et al. | |
| 10,331,944 | B2 | 6/2019 | Anderson et al. | |
| 2006/0222209 | A1* | 10/2006 | Zhang | G08B 29/188 |
| | | | | 382/107 |
| 2011/0085728 | A1 | 4/2011 | Gao et al. | |
| 2011/0267544 | A1 | 11/2011 | Mei et al. | |
| 2016/0092561 | A1 | 3/2016 | Liu et al. | |
| 2017/0316256 | A1* | 11/2017 | Kim | G06V 20/47 |
| 2019/0354774 | A1* | 11/2019 | Leizerovich | G08B 13/19695 |
| 2020/0125879 | A1* | 4/2020 | Diehl | G06V 20/41 |
| 2021/0097338 | A1* | 4/2021 | Ananthapur Bache | |
| | | | | G06F 18/251 |
| 2021/0203855 | A1* | 7/2021 | Mo | G06T 7/73 |
| 2021/0312182 | A1* | 10/2021 | Winter | G06F 18/24 |

OTHER PUBLICATIONS

Stephen W. Smoliar et al., "Content-Based Video Indexing and Retrieval," 1994 IEEE pp. 62-72. (Year: 1994).*

Abdollahian et al., "Analysis of unstructured video based on camera motion". In Proceedings of Multimedia Contenl Access: Algorithms and Systems, Jan. 29, 2007, 6 Pages.

(Continued)

*Primary Examiner* — Cheryl Lewis
(74) *Attorney, Agent, or Firm* — Holzer Patel Drennan

(57) ABSTRACT

A video indexing system identifies groups of frames within a video frame sequence captured by a static camera during a same scene. Context metadata is generated for each frame in each group based on an analysis of fewer than all frames in the group. The frames are indexed in a database in association with the generated context metadata.

19 Claims, 5 Drawing Sheets

(56) References Cited

OTHER PUBLICATIONS

Lai et al., "Robust camera motion estimation and classification for video analysis", In Proceedings of Visual Communications and Image Processing, Jan. 18, 2004, pp. 912-923.

Sreeja et al., "Ant colony optimization based binary search for efficient point pattern matching in images", In European Journal of Operational Research, vol. 246, Issue 1, Oct. 2015, pp. 154-169.

"International Search Report and Written Opinion Issued in PCT Application No. PCT/US21/029033", dated Aug. 10, 2021, 9 Pages.

\* cited by examiner

METADATA GENERATION FOR VIDEO INDEXING

BACKGROUND

The rise of cloud storage platforms has led to the development of massive cloud-based video databases. The demand for video indexing and searching tools is higher than ever, but video indexing efforts are complicated by the diverse nature of video data hosted on such platforms and, in some cases, a lack of basic information about the format and nature of video content being stored. For example, a video indexing system may not be provided with metadata that identifies a source of video data (e.g., media entertainment, security footage, personal user video) and also may not be provided with basic video format information such as whether a sequence of frames represent a continuous scene or multiple different scenes and/or whether the frames comprise footage captured by multiple cameras or a single camera. Cloud storage providers therefore continue to seek processor-efficient solutions for meaningfully indexing vast and diverse archives of video data.

SUMMARY

According to one implementation, a video indexing system analyzes a sequence of video frame to determine whether the sequence was captured by a static camera. Response to determining that the sequence of frames was captured by the static camera, generating context metadata for each frame in the sequence based on an analysis of fewer than all frames in the sequence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Video indexing platforms may implement various types of image processing techniques to generate context metadata that may be used to index video content. As used herein, "context metadata" refers to metadata that provides context about the content of a particular video or video frame. For example, a video indexing platform may execute object and character recognition algorithms to generate data that is descriptive of the video content, such as keywords (descriptors) that are then stored in association with the video data and that may be used in a user-initiated text-based query to retrieve the video from a database.

In general, cloud-based video indexing systems may incur heavy processing overhead due, in part, to the fact that such systems are incapable of making initial source-related assumptions that may simplify the generation of context metadata. For example, a cloud-based video indexing platform may not be provided with information usable to infer whether a sequence of video frames represents multiple different scenes, a continuous scene, a continuous scene comprised of footage captured by multiple cameras, a single scene captured by a single camera, and/or whether the camera(s) were fixed in position or moving when the footage was captured. Without being provided with this type of basic information about stored video data, video analysis efforts may entail a complex, ground-up analysis of each individual frame, first in isolation (e.g., to identify objects presents in a same) and second, in comparison to another analyzed frames, such as to determine whether the same or different objects are present within each frame of a video stream, to perform object tracking, and/or more make sophisticated inferences about the actions occurring in the scene and the nature of the scene as a whole.

According to one implementation, the herein disclosed technology video indexing system determines whether each frame in a video can be classified as part of a scene that was captured (filmed) by a single static camera. As used herein, a "static camera" refers to one that is fixed in position (e.g., fixed relative to all stationary objects in a scene). In cases where it is possible to classify a frame as part of a scene captured by a static camera, the system implements specialized processing procedures that mitigate overhead with respect to that individual frame. For example, descriptors and labels may be generated for an entire sequence of frames that collectively comprise a static camera scene based on analysis limited—at least partially—to a single frame or a small group of frames from the scene. This simplification may dramatically reduce the complexity of generating more sophisticated (enhanced) context metadata, such as metadata that depends on multi-object and/or cross-frame inferences, object tracking, extraction of subject biometrics, and action identification.

Figure 1:
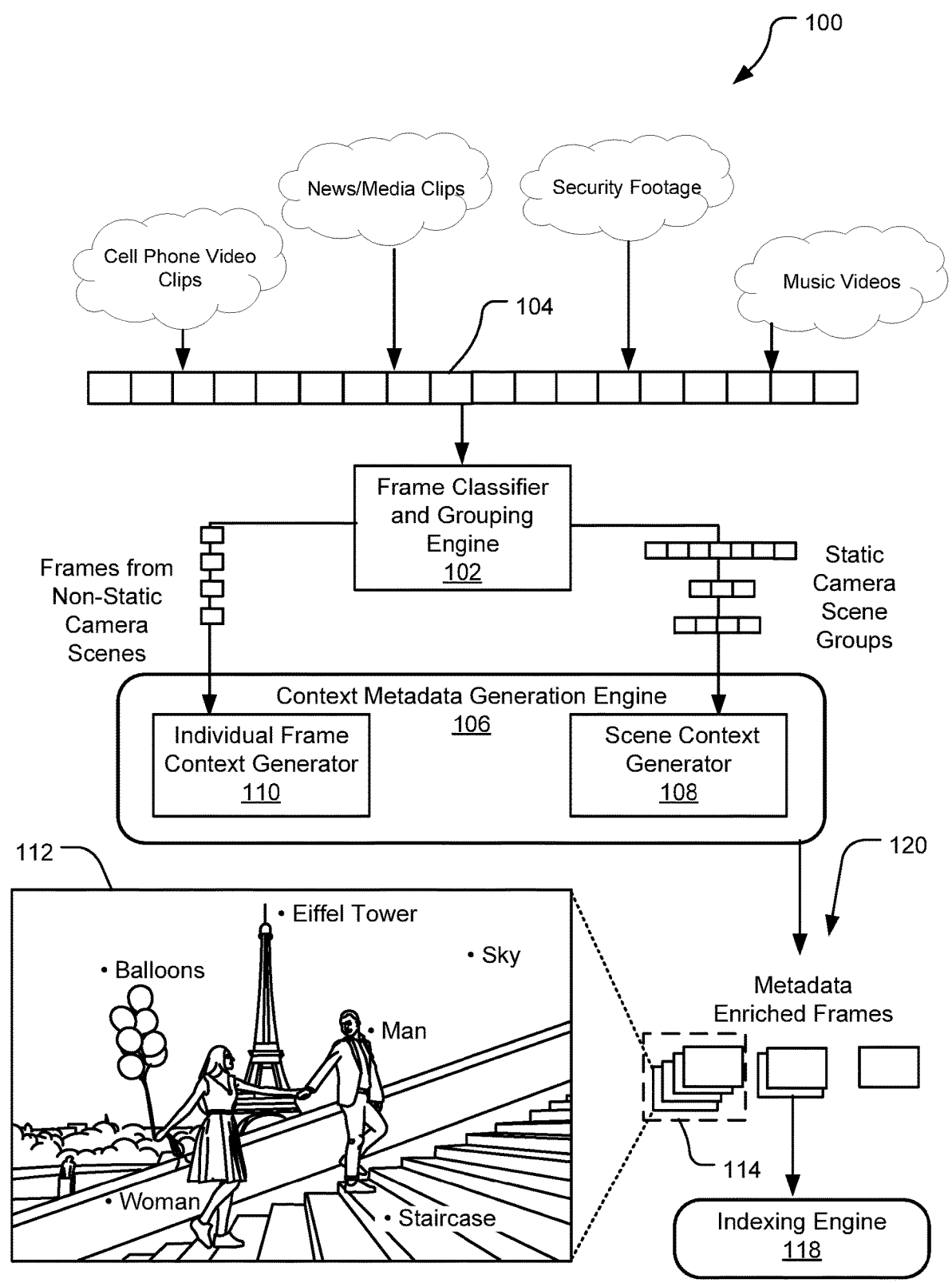
FIG. 1 illustrates an example video indexing system that makes inferences about camera movement to simplify the generation of context metadata used to index video content.

FIG. 1 illustrates an example video indexing system 100 that performs an initial analysis of camera movement to simplify the generation of context metadata used to index video content. The video indexing system 100 includes a frame classifier and grouping engine 102 that analyzes streams of video data 104 to identify groups of consecutive frames that comprise static camera scenes. As used herein, a "static camera scene" refers to a consecutive sequence of video frames recorded with a static camera that comprise all or part of a video scene. The frame classifier and grouping engine 102 receives the video data 104 that is, in one implementation, data uploaded to a cloud-based storage provider. For example, the cloud-based storage provider may host video data generated by different types of content creators (e.g., individual users, small business, large enterprises) for a myriad of different purposes (e.g., security footage, entertainment media, narrative or educational media, home videos, etc.).

In one implementation, the frame classifier and grouping engine 102 analyzes one or more frames of each stored video file to classify the video file and/or the individual frames of the video as either (1) belonging to a static camera scene group or, alternatively, (2) as "not" belonging to a static camera scene group. For example, a static camera scene group may comprise security footage captured by a fixed security camera or a news clip featuring an news anchorman sitting at a desk that is fixed in position relative to the camera and various stationary background objects. In contrast, a frame that is captured with a non-static (moving) camera or that cannot otherwise be matched with one or more other frames of a same static camera scene group is classified as "not" belonging to a static camera scene group.

In one implementation, the frame classifier and grouping engine 102 analyzes video data to identify feature points, such as inanimate objects and landmarks, within individual frames of a video stream. The positions of these inanimate objects or landmarks are compared across temporally similar frames to determine whether those frames belong to a same static camera scene group. As used herein, two frames are "temporally similar" when captured within a threshold time interval of one another and/or when separated by a fewer than a threshold number of frames in a video sequence.

In some scenarios, a video may include some frames that comprise a static camera scene group and some frames that do not. For example, a music video may include a subset of frames captured with a fixed camera (e.g., choreographed dancers in front of fixed background) and other frames that were captured with a moving camera. Frames that share a continuity or commonality of subject matter do not necessarily belong to a same static camera scene group. For example, a movie scene may consist of some frames that do not belong to a static scene group (e.g., the camera pans across the horizon) while also consisting of frames of one or more static camera scene groups (e.g., the camera stops panning and remains fixed at a point or object on the horizon).

Outputs of the frame classifier and grouping engine 102 are provided, along with the frame data, to a context metadata generation engine 106. In general, the frame context generation engine generates context metadata usable to index the individual frames and/or static camera scene groups in a searchable manner. In different implementations, context metadata generated by the context metadata generation engine 106 includes without limitation descriptors of individual objects (e.g., "person," "crosswalk", "bus," "building"), labels describing a scene as a whole (e.g., "city at night," "busy city sidewalk"), action identifiers (e.g., "sliding into home plate"), biometric data (e.g., subject height, eye or hair color, weight approximation), object size, relative positions, and more.

According to one implementation, the context metadata generation engine 106 performs a different sequence of processing operations when generating context data for frames that belong to a static camera scene group than when generating context data for frames that are not identified as being part of a static camera scene group. Frames that belong to a static camera scene group are provided to and processed by a scene context generator 108 while frames that do not belong to a static camera scene group are provided to and processed by an individual frame context generator 110.

The scene context generator 108 generates at least some context metadata data for each frame in a same static camera scene group based on an analysis of fewer than all frames in the group. For example, the scene context generator 108 may generate context metadata (e.g., descriptors and/or labels) for a single keyframe in a static camera scene group and then jointly associate that context data with each separate frame of the static camera scene group for indexing purposes. In this sense, certain types of context metadata associated with a video frame in a database may be generated initially by analyzing one or more other, different frames (e.g., in isolation and/or possibly without any analysis on the frame(s) to be eventually associated with the context metadata).

By example and without limitation, FIG. 1 shows a frame 112 that the frame classifier and grouping engine 102 identifies as belong to a static camera scene group 114. The scene context generator 108 analyzes a select keyframe from the static camera scene group 114 and generates descriptors for the scene including "Eiffel Tower," "balloons," "staircase," "man," "woman," and "sky." It can be assumed that the other frames (not shown) in the static camera scene group 114 are not identical to the frame 112. For example, the remaining frames in the static camera scene group may, for example, depict the man and woman in different positions as they ascend the staircase. In one implementation, the scene context generator 108 associates the descriptors generated for the frame 112 with each of the other frames in the static camera scene group 114 without subjecting those other frames to the image processing steps used to generate the descriptors with respect to the frame 112. This significantly reduces processing complexity.

Notably, some implementations of the scene context generator 108 may still perform other types of analysis on each of the frames within the static camera scene group 114, such as to generate more sophisticated metadata that is based on multiple frames of a video (e.g., action identification, object size and distance calibrations). However, even in these cases, significant processing efficiencies may still be realized by due to the fact that at least some portion of the context metadata does not need to be regenerated with respect to each individual frame in the static camera scene group 114.

Frames that are not identified as belonging to a static scene group are analyzed by the individual frame context generator 110. Each one of these non-static camera group frames (e.g., moving camera frames) is analyzed individually and in isolation such that context metadata for the frame is generated without relying on an analysis of temporally similar frames. In this sense, the individual frame context generator 110 generates at least some context metadata, such as image descriptors, for every single frame based on an image analysis that is repeated for every single frame.

The context metadata generation engine 106 scene context generator 108 outputs metadata-enriched frames 120 which are then provided to an indexing engine 118 that indexes the metadata-enriched frames 120 within a database such that the frames can be retrieved by a search engine in response to a text-based user query.

Figure 2:
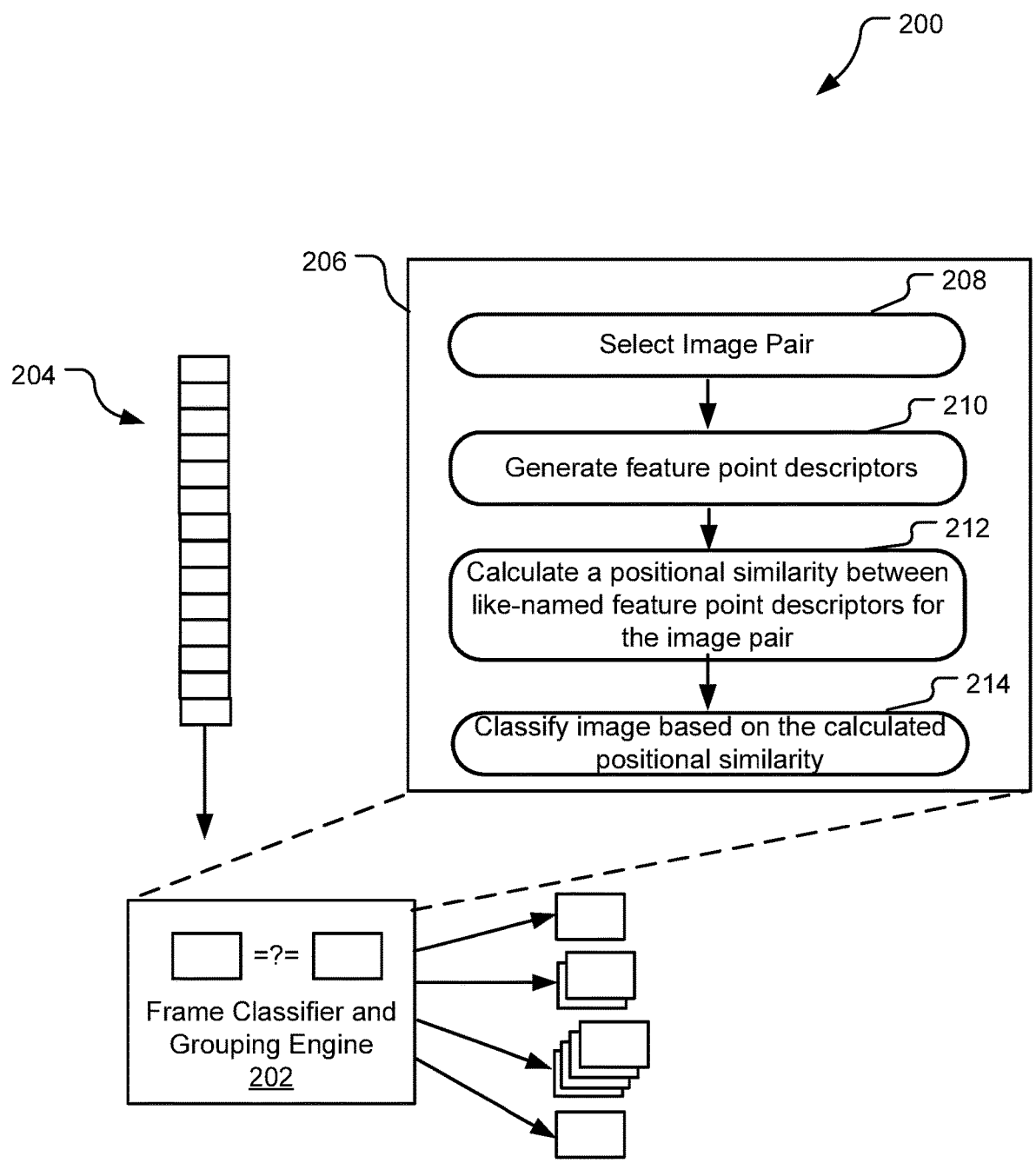
FIG. 2 illustrates exemplary actions for camera movement and scene classification performed by a frame classifier and grouping engine in a video indexing system.

FIG. 2 illustrates exemplary actions for camera movement and scene classification performed by a frame classifier and grouping engine 202 in a video indexing system 200. The frame classifier and grouping engine 202 receives a sequence 204 of video frames which may, for example, represent a single video file or multiple video files.

According to implementation, the frame classifier and grouping engine 202 cyclically repeats a sequence of actions shown in box 206 including a selection operation 208, an analysis operation 210, a calculation operation 212, and a classification operation 214. During the selection operation 208, the frame classifier and grouping engine 202 selects an image pair that is analyzed during the analysis operation 210 to generate feature point descriptors. This analysis may, for example, entail utilizing a trained image classifier to identify landmarks and/or background objects such the horizon, clouds, buildings, trees, etc. and to associate identifiers (e.g., descriptor types) with particular locations in each of the two images. The images of each pair are either directly sequential within the sequence 204 or that are within a predefined separation of one another within the sequence 204. For example, the frame classifier and grouping engine 202 may sample from the sequence 204 at a defined interval, such as every 5 or 10 frames, or with other defined periodicity. In one implementation, the sequence 204 includes compressed video data and the selection operation 28 selects key frames from different packets of the video data such that each selected image pair includes a key frame from two different consecutive data packets.

During the calculation operation 212, the frame classifier and grouping engine 202 measures a similarity in the positions of like-named feature point descriptors (e.g., "building," "tree," "horizon") that are associated with both images in the image pair. Based on the measurement, the frame classifier and grouping engine 202 classifies the images via the classification operation 214 as either being the "same" (e.g., from a same static scene group) or not the same. For example, images of the pair are classified as being from a same static camera scene group when the position of like-named descriptors in the two images satisfy a threshold level of similarity relative to one another.

With the selection of each new pair of images via the selection operation 208, the frame classifier and grouping engine 202 discards one of the two images of the previously-selected pair and select a new image from the sequence 204 to pair with the remaining image of the previously-selected pair. If, for example, a first comparison is between images 1 and 2, a second comparison is between images 2 and 3, followed by a comparison between images 3 and 4, where 1, 2, 3, and 4 appear in consecutive order within the sequence 204. In some implementations, a trained image classifier is utilized to build the image arrays in lieu of the logical operations described with respect to box 206.

By cyclically performing the operations 208-214 the above manner, the frame classifier and grouping engine 202 builds arrays of static camera scene groups. Frames that are assigned to static camera scene groups may be appended with a metadata identifier identifying the associated group.

Figure 3:
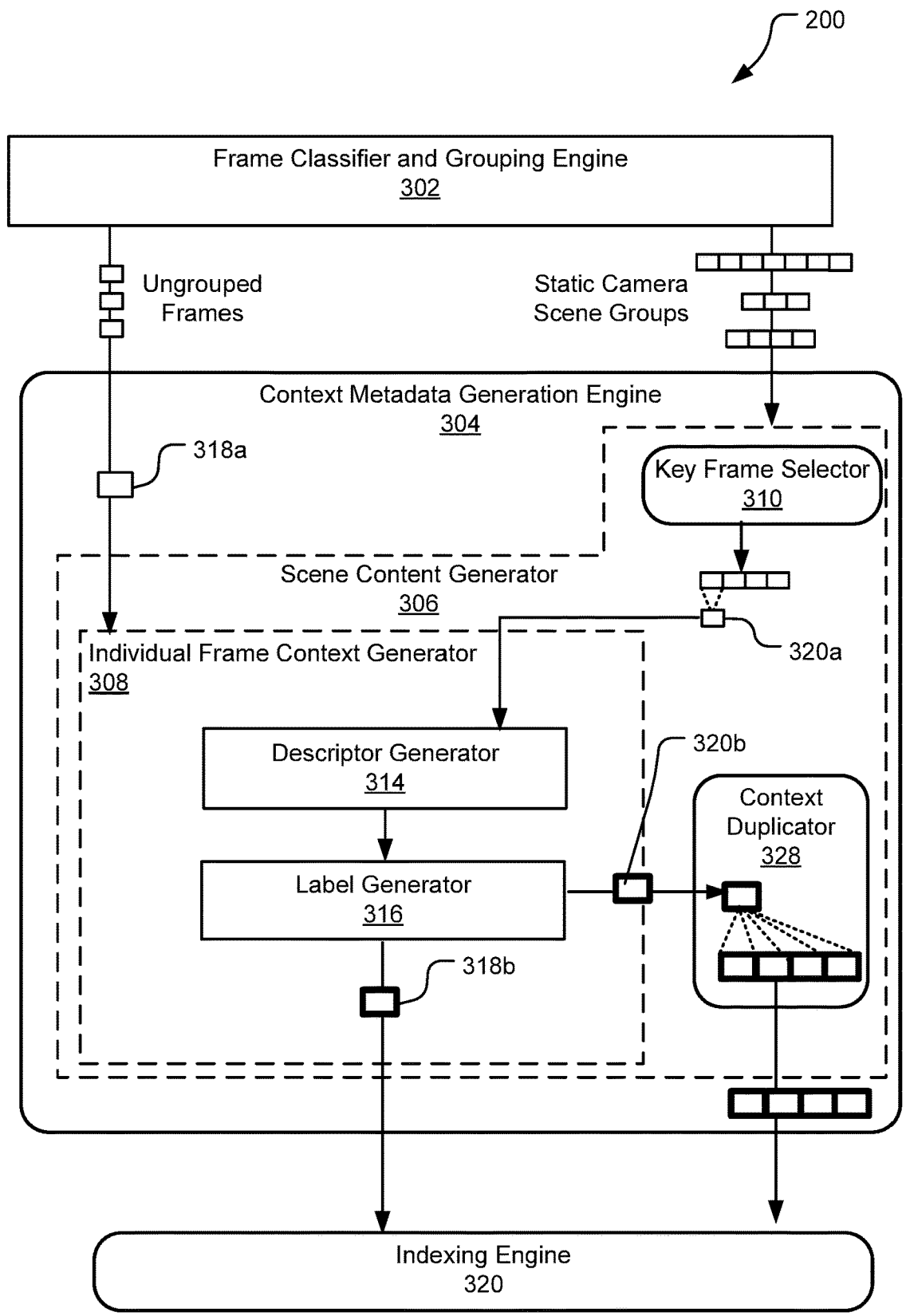
FIG. 3 illustrates another example video indexing system that makes inferences about camera movement to inform and simplify the generation of context metadata used to index video content.

FIG. 3 illustrates an example video indexing system 300 that uses camera movement to inform and simplify the generation of context metadata used to index video content. The video indexing system 300 includes a frame classifier and grouping engine 302 that classifies frames in a video stream into static camera scene groups, such as in the manner the same or similar to that described above with respect to FIGS. 1 and 2.

The video indexing system 300 further includes a context metadata generation engine 304 that processes data of each frame differently depending upon the outcome of the classification assigned to the frame by the frame classifier and grouping engine 302. In FIG. 3, the context metadata generation engine 304 includes an individual frame context generator 308 and a scene context generator 306, each of which are shown in dotted lines so as to illustrate an associated collection of subcomponents (e.g., software modules) some of which are executed by both the individual frame context generator 308 and the scene context generator 306.

Individual frames that are not part of an identified static camera scene group (e.g., frame 318a) are each provided to the individual frame context generator 308, which is shown to include two sub-modules—a descriptor generator 314 and a label generator 316. The descriptor generator 314 performs image analysis on each individual frame and generators descriptors (e.g., keywords) for each frame that identify objects in the frame (e.g., man, woman, balloons, Eiffel tower), scenery in the frame (e.g., staircase, horizon), and/or adjectives that describe the objects and scenery present in the scene (e.g., "multicolored balloons"). The label generator 316 generates one or more labels for each processed frame that are, in one implementation, based on the descriptors generated by the descriptor generator 314. In the example of the video frame illustrated in FIG. 1 (e.g., the image of the Eiffel tower with the man, woman, and balloons), the label generator 312 may, for example, generate a label that is based on the descriptors and that describes the scene as a whole, such as "Romantic Afternoon Date" or "Tourists in Paris."

Following the generation of metadata for the frame 318a, the individual frame context generator 308 updates the frame 318a to include the metadata and outputs the result (e.g., a metadata-enriched frame 318b) to an indexing engine 320. Notably, other implementations of the individual frame context generator 308 may include additional modules not shown in FIG. 3 that implement logic in addition to or in lieu of the operations performed by the descriptor generator 314 and the label generator 316.

The context metadata generation process varies somewhat for frames identified as belonging to a static camera scene group. Frames of each identified static camera scene group are jointly received and collectively processed by the scene context generator 306, which is shown to incorporate a number of sub-modules including the individual frame context generator 308 as well as a keyframe selector 310 and a context duplicator 328.

In one implementation, the keyframe selector 310 selects a keyframe 320a from each static camera scene group. This keyframe 320a is provided to the individual frame context generator 308 and subjected to operations the same or similar to those described above with respect to the frame 318a. The individual frame context generator 308 generates enriched metadata for the keyframe 320a, outputting metadata-enriched keyframe 320b.

At this point, a context duplicator 328 duplicates some or all of the context metadata included within metadata-enriched keyframe 320b and associates this duplicated metadata with each other frame that belongs to the same static camera scene group. In this case, the descriptors and labels generated for the keyframe 320a are appended to or otherwise stored in association with each other frame in the corresponding static camera scene group such that each of the other frames in the same static camera scene group does not need to be individually processed (e.g., subjected to the image recognition processing performed on the keyframe 320a) to generate its respective set of descriptors and labels.

In some implementations, the frames of the various identified static camera scene groups may be subjected to certain additional processing operations in excess of that described above, such as the exemplary operations for enhanced metadata generation described that are described below with respect to FIG. 4. Even in these other implementations, however, efficiencies are still realized by limiting the initial image analysis for descriptor/label generation to a single keyframe of the group.

Figure 4:
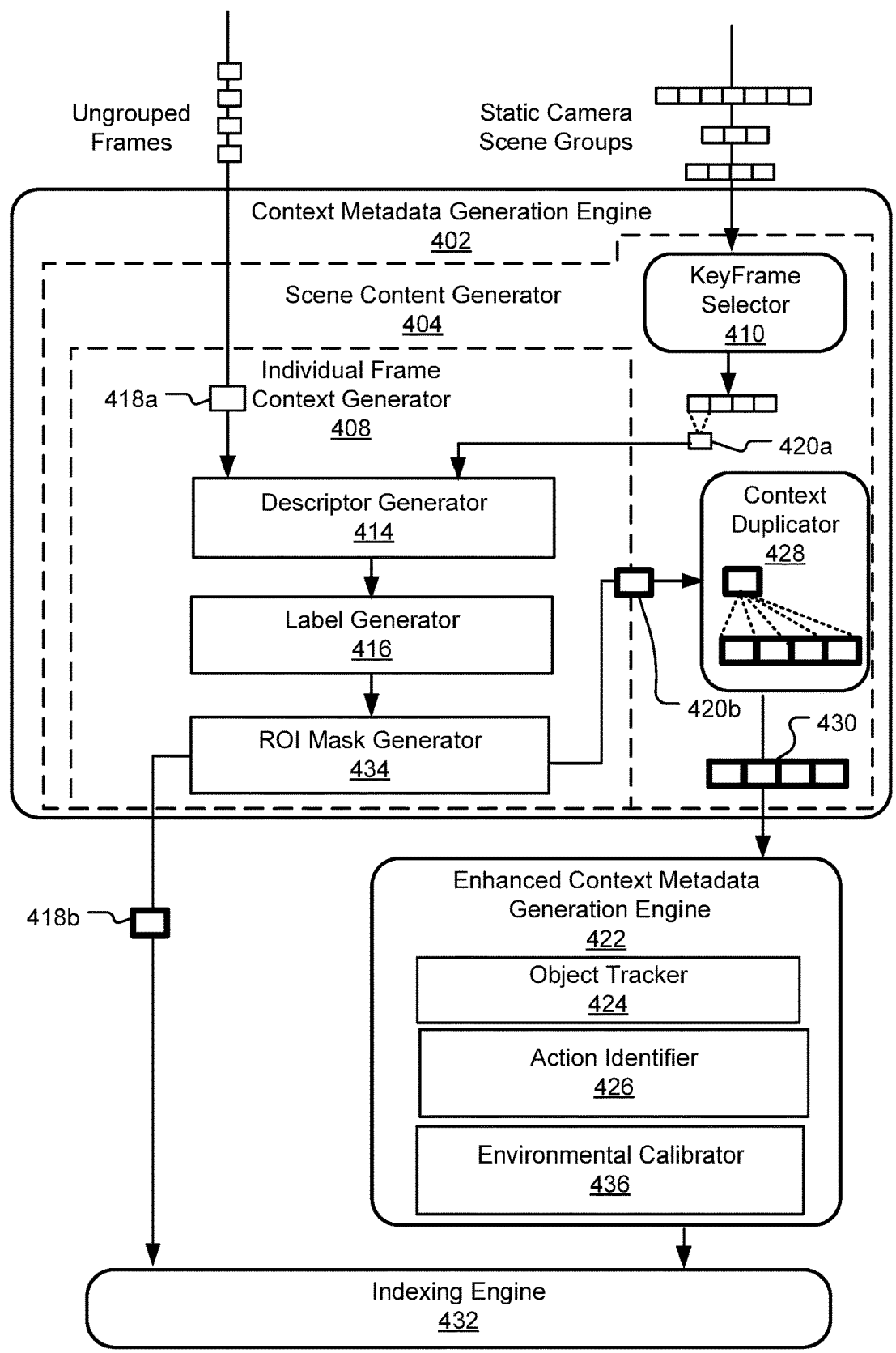
FIG. 4 illustrates still another example video indexing system that uses camera movement to inform and simplify the generation of context metadata.

FIG. 4 illustrates an example of yet another video indexing system 400 that uses camera movement to inform and simplify the generation of context metadata usable to index video content. The video indexing system 400 includes a context metadata generation engine 402 that analyzes video frames to generate context metadata useful for indexing each frame in a searchable database. Each frame received at the context metadata generation engine 402 has been previously classified as either being an individual frame (e.g., a frame that has not been identified as belonging to a static camera frame group) or a static camera group frame (e.g., a frame that belongs to a previously-identified static camera frame group). This classification is provided to the context metadata generation engine 402 in association with each received frame.

Like the video indexing system of FIG. 3, the context metadata generation engine 402 includes an individual frame context generator 408 that analyzes individual frames (e.g., in isolation) to generate metadata for those frames. For example, the individual frame context generator 408 is shown receiving an individual frame 418a and outputting a corresponding metadata-enriched frame 418b. The video indexing system 400 further includes a scene context generator 404, which includes a keyframe selector 410 and a context duplicator 428 that perform the same or similar functions to those described with respect to like-named components in FIG. 3.

However, in addition to the components described above with respect to FIG. 3, the video indexing system 300 also includes an enhanced context metadata generation engine 422 that performs additional analysis on the subset of frames that are classified as belonging to a respective static camera. The enhanced context metadata generation engine 422 analyzes multiple frames within each static camera scene group to draw inferences based on the multiple frames and generate high-level context metadata. Examples of higher-level context metadata include, without limitation, metadata identifying actions occurring within the scene (e.g., based on recognized movements) as well as sizes and distances between objects in the scene.

Notably, the individual frame context generator 408 is, in FIG. 4, shown to include a region-of-interest (ROI) mask generator 434, which is not present in the implementation of FIG. 3. The ROI mask generator 434 performs a particular processing operation that serves to simplify processing operations subsequently performed by the enhanced context metadata generation engine 422.

Although the term "ROI mask" is widely used and understood in image processing, it may be appreciated that an ROI mask may be used to identify a region that is actually of "non-interest." For example, regions of sky, water, grass, or other background regions may be identified as regions of "non-interest" in the sense that these regions may be selectively ignored during further processing of the enhanced context metadata generation engine 422, thereby reducing the extent and complexity of such subsequently-performed operations.

In one implementation, the ROI mask generator 434 automatically generates an ROI mask for each region within a frame that is determined to satisfy predefined "non-interest" criteria. For example, a particular region may be a region of non-interest if defines a patch of sky, water, etc. For example, the ROI mask generator 434 selectively masks a background area of non-interest with respect to a keyframe 420a and embeds the mask location within the metadata-enriched keyframe 420b that is output by the individual frame context generator 408. Notably, this ROI analysis and mask generation may, in some implementations, be skipped during processing of individual frames that that are not classified as belonging to a static camera scene groups.

Upon receiving output from the individual frame context generator 408 (e.g., a metadata-enriched keyframe 420b), the context duplicator 428 automatically duplicates the metadata of the metadata-enriched keyframe 420b to the other frames of the same static scene group such that each other frame in the group also includes the ROI mask metadata for the metadata-enriched keyframe 420b. The group of metadata-enhanced frames (e.g., 430) is provided to the enhanced context metadata generation engine 422 and the area within each frame defined by the associated ROI mask(s) is selectively omitted from analysis and processing performed by the enhanced context metadata generation engine 422.

In different implementations, the enhanced context metadata generation engine 422 may include different software modules that are configured to perform different types of processing operations to generate different varieties of enhanced context metadata usable to index the frames of each static camera scene group. By example and without limitation, the enhanced context metadata generation engine 422 is shown to include an object tracker 424, an action identifier 426, and an environmental calibrator 436—all of which perform processing operations that may be simplified due to the use of the ROI masks on static camera scene groups (as described above) as well as due to the classification of received images as belonging to respective static camera frame groups.

The object tracker 424 executes logic to track objects (living and non-living) that move throughout different frames of a same static camera scene group. Most tracking algorithms execute logic designed to predict, with some level of confidence, whether an object visible in one frame is the same as an object visible in another frame. Object tracking becomes increasing complex in scenarios where the frame of reference (e.g., the camera field-of-view) is moving in addition to the objects in the scene. However, in the implementation of FIG. 4, the object tracker 424 can safely assume that frames within each static camera scene group were captured by a static (unmoving) camera. Thus, the object tracker 424 can execute a tracking algorithm with significantly relaxed constraints that is less processor intensive than tracking algorithms that must account for potentially non-stationary frames of reference. Moreover, the use of like-positioned ROI masks within each frame of a static camera scene group allows the object tracker 424 to ignore pixel activity in the area defined by the ROI mask, thereby reducing the total area of each scene that is processed by the object tracker 424.

The object tracker 424 generates metadata that describes the movements of objects within each static camera scene group. For example, the object tracker 424 may analyze the descriptors initially identified for the keyframe 420a, associate positions with those descriptors with respect to each frame of the static camera scene, and/or generate and append to each frame additional metadata from which the movements of the objects throughout the scene can be readily understood.

The action identifier 426 analyzes metadata generated by the object tracker 424 in conjunction with the descriptors and labels initially generated for the select keyframe (e.g., 420a) of the static camera scene. From this analysis, the action identifier 426 infers actions that occur across multiple frames of a static camera scene in association with one or more tracked objects. For example, the action identifier 426 may identify a "robbery" based on security footage labeled with descriptors such as "store," "night," "man," that is associated with tracking data that indicates that the man both enters and leaves the store in a short period of time when no other people are present. Similarly, the action identifier 426 may be trained to use the tracking data for the various objects to identify actions such as "shopping," "dancing", etc.

The environmental calibrator 436 performs environmental calibrations that depend on data extracted from multiple frames of a static camera scene. For example, the environmental calibrator 436 may apply principles of triangulation (relying on alignment differences in different frames) to estimate distances between objects and sizes of objects, such as to extract biometric data such as a user's height.

Outputs of the enhanced context metadata generation engine 422 are provided to the indexing engine 432, which indexes the frames in association with the generated context metadata in a database such that the frames can be retrieved by a search engine in response to a text-based user query.

Notably, the processing performed by the object tracker 424, action identifier 426, and the environmental calibrator 436 is simplified dramatically as a result of the initial grouping of frames into static camera scene groups and by limiting the analyses performed by the enhanced context metadata generation engine 422 to the frames within the static camera scene groups. Within different frames of a same static camera scene, there exists a high probability that like-named descriptors correspond to a same object. Consequently, changes in apparent object position can be reliably interpreted as actions attributable to the object and assumptions can be made about the object's relation to its environment. Thus, the framework provided by the image indexing system 400 is one that enables the generation of complex context metadata while significantly reducing processing complexity and resource consumption as compared to other readily available solutions.

Figure 5:
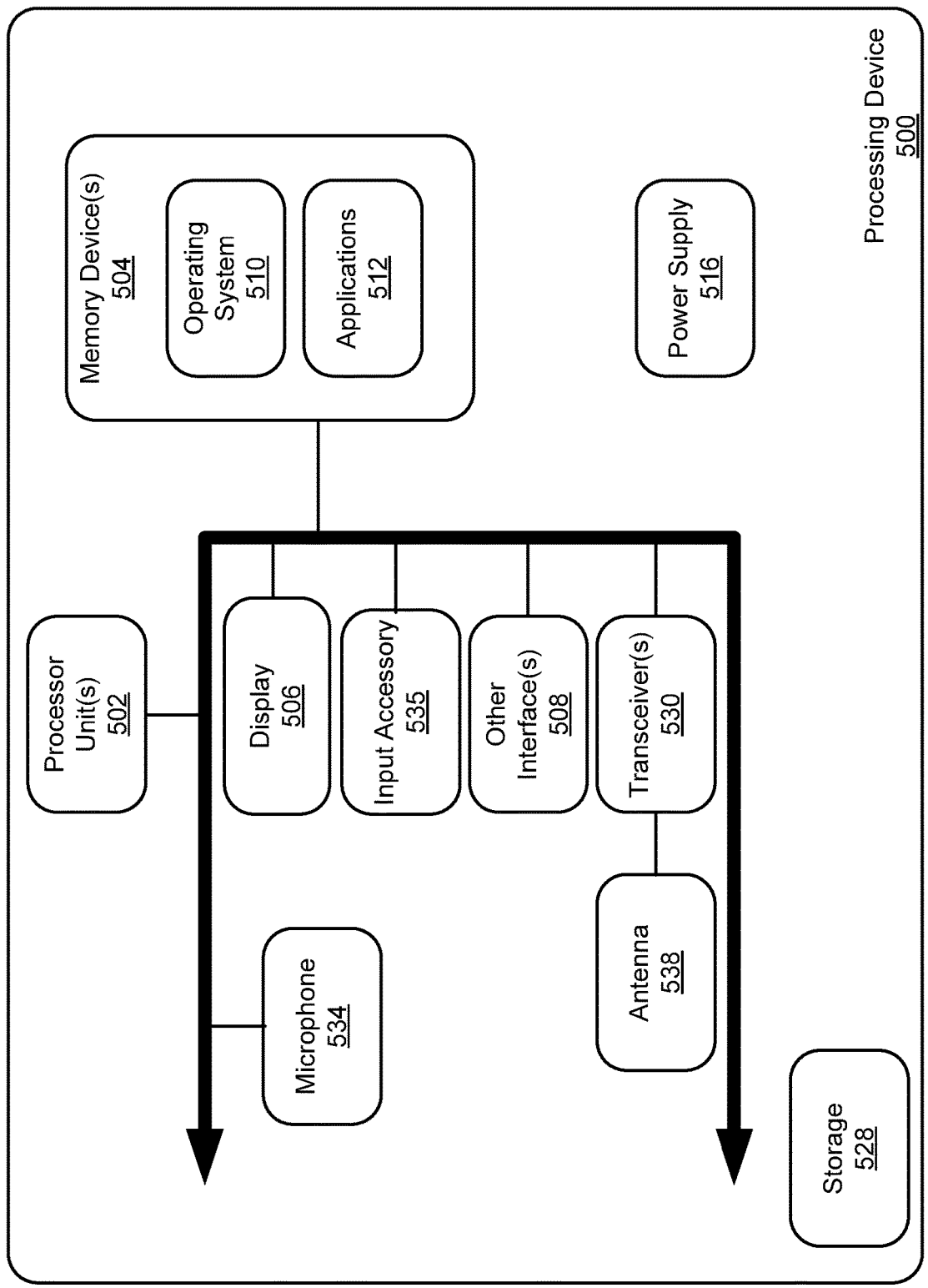
FIG. 5 illustrates an example schematic of a processing device suitable for implementing aspects of the disclosed technology.

FIG. 5 illustrates an example schematic of a processing device 500 suitable for implementing aspects of the disclosed technology. The processing devices 500 includes one or more processor unit(s) 502, memory device(s) 504, a display 506, and other interfaces 508 (e.g., buttons). The processor unit(s) 502 may each include one or more CPUs, GPUs, etc.

The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, may resides in the memory 504 and be executed by the processor unit(s) 502, although it should be understood that other operating systems may be employed.

One or more applications 512 (e.g., the frame classifier and grouping engine 102, the context metadata generation engine 106, the enhanced context metadata generation engine 422, the indexing engine 118) are loaded in the memory 504 and executed on the operating system 510 by the processor unit(s) 502. The applications 512 may receive inputs from one another as well as from various input local devices such as a microphone 534, input accessory 535 (e.g., keypad, mouse, stylus, touchpad, gamepad, racing wheel, joystick), and a camera 532. Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include one or more storage devices 528 (e.g., non-volatile storage). Other configurations may also be employed.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method disclosed herein provides for analyzing a sequence of video frames to determine whether the sequence was captured by a static camera. If so, the method provides for generating context metadata for each frame in the sequence based on an analysis of fewer than all frames in the sequence.

In an example method of any preceding method, the method further comprises determining that a select frame of the sequence was captured by a moving camera. Responsive to such determination, the select frame is subjected to a first series of processing operations for generating the context metadata that is different than a second series of processing operations used to generate the context metadata for the frames in the sequence captured by the static camera.

In still another example method of any preceding method, the first series of processing operations generates context metadata for the select frame based on an image analysis that is limited to the select frame.

In yet still another example method of any preceding method, generating context metadata for each frame in the sequence further comprises: selecting a keyframe from the sequence; generating at least a portion of the context metadata based on an analysis of the keyframe without analyzing other frames of the sequence; and indexing the other frames of the sequence in association with the generated context metadata.

In another example method of any preceding method, generating the context metadata further comprises generating descriptors for multiple objects present in the keyframe.

Still another example method of any preceding method further comprises generating a scene label generated based on the descriptors generated for the keyframe.

In still another example method of any preceding method, the context metadata further comprises: generating a region of interest (ROI) mask for the keyframe; applying the ROI mask to each frame other frame in the sequence; and omitting an area defined the ROI mask from subsequent processing operations performed on each of the frames of the sequence.

Still another example method of any preceding method further comprises determining a size of an object present in multiple frames of the sequence responsive to determining that the sequence of frames was captured by a static camera. The size of the object is determined by analyzing a position of the object relative to a fixed reference point that appears within each of the multiple frames.

Still another example method of any preceding method provides for executing object tracking logic that assumes a fixed camera frame of reference responsive to determining that the sequence of frames was captured by the static camera.

An example video indexing system includes a frame classifier, a context metadata generation engine, and an indexing engine. The frame classifier classifies video frames received as part of a sequence into different static camera scene groups. The context metadata generation engine receives a group of frames classified as comprising a same static camera scene group and analyzes fewer than all frames in the group to generate context metadata for each frame in the group. An indexing engine indexes each frame in the group in a database in association with the generated context metadata.

In an example video indexing system of any preceding system, the context metadata generation engine is further adapted to determine that a select frame of the sequence was captured by a moving camera and, responsive to the determination, generate context metadata for the select frame based on an image analysis limited to the select frame.

In still another example video indexing system of any preceding system, the context metadata generation engine is further adapted to select a keyframe from the group, and generate at least a portion of the context metadata for each frame in the group based on an analysis of the keyframe without analyzing other frames of the group.

In another example video indexing system of any preceding system, the context metadata generation engine is adapted to generate a region of interest (ROI) mask for the keyframe of the group, apply the ROI mask to each frame in the group; and omit an area defined by the ROI mask from subsequent processing operations performed on the frames of the group.

In yet another example video indexing system of any preceding system, the context metadata includes descriptors for multiple objects present in the keyframe.

In still another example video indexing system of any preceding system, the context metadata includes a scene label generated based on the descriptors generated for the keyframe.

In yet still another example video indexing system of any preceding system, the system further includes an object tracker that executes logic to track movements of objects throughout multiple frames of the group. The logic implements constraints that assume a fixed frame of reference for a camera capturing the video.

An example tangible computer-readable storage media disclosed herein encodes computer-executable instructions for executing a computer processes comprising: classifying video frames within a sequence into different static camera scene groups; generating context metadata for each frame in a group of the different static camera scene groups, and indexing each frame in the group in a database in association with the generated context metadata. The context metadata is generated based on an analysis of fewer than all frames in the group.

In yet still another example computer-readable storage media of any preceding computer-readable storage media, the computer-readable storage media encodes a computer process that further comprises selecting a keyframe from the group and generating at least a portion of the context metadata for each frame in the group based on an analysis of the keyframe without analyzing other frames of the group.

In still another example computer-readable storage media of any preceding computer-readable storage media, the computer-readable storage media encodes a computer process that further comprises determining that a select frame of the sequence was captured by a moving camera and, responsive to the determination, generating context metadata for the select frame based on an image analysis limited to the select frame.

In yet another example computer-readable storage media of any preceding computer-readable storage media, the computer process further comprises generating a region of interest (ROI) mask for the keyframe of the group; applying the ROI mask to each frame in the group; and omitting an area defined by the ROI mask from subsequent processing operations performed on the frames of the group.

An example system disclosed herein includes a means for classifying video frames within a sequence into different static camera scene groups and a means for generating context metadata for each frame in a group of the different static camera scene groups, the context metadata being generated based on an analysis of fewer than all frames in the group. The system further includes a means for indexing each frame in the group in a database in association with the generated context metadata.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
analyzing a sequence of video frames to determine whether the sequence was captured by a static camera;
responsive to determining that the sequence of frames was captured by the static camera, subjecting the sequence of frames to a first series of processing operations that includes generating context metadata for each frame in the sequence based on an analysis of fewer than all frames in the sequence; and
responsive to the determining that a select frame of the sequence of frames was captured by a moving camera, subjecting the select frame to a second series of processing operations for generating the context metadata that is different than the first series of processing operations.

2. The method of claim 1, wherein the second series of processing operations generates context metadata for the select frame based on an image analysis that is limited to the select frame.

3. The method of claim 1, wherein generating context metadata for each frame in the sequence based on the analysis of fewer than all frames in the sequence further comprises:
selecting a keyframe from the sequence;
generating at least a portion of the context metadata based on an analysis of the keyframe without analyzing other frames of the sequence; and
indexing the other frames of the sequence in association with the generated context metadata.

4. The method of claim 3, wherein generating the context metadata further comprises:
generating descriptors for multiple objects present in the keyframe.

5. The method of claim 4, wherein generating the context metadata further comprises:
generating a scene label generated based on the descriptors generated for the keyframe.

6. The method of claim 3, wherein generating the context metadata further comprises:
generating a region of interest (ROI) mask for the keyframe;
applying the ROI mask to each of the other frames in the sequence; and
omitting an area defined by the ROI mask from subsequent processing operations performed on each of the other frames of the sequence.

7. The method of claim 1, further comprising:
responsive to determining that the sequence of frames was captured by a static camera, determining a size of an object present in multiple frames of the sequence by analyzing a position of the object relative to a fixed reference point that appears within each of the multiple frames.

8. The method of claim 1, further comprising:
responsive to determining that the sequence of frames was captured by the static camera, executing object tracking logic that assumes a fixed camera frame of reference.

9. A video indexing system comprising:
a frame classifier that classifies video frames received as part of a sequence into different static camera scene groups;
a context metadata generation engine that:
receives a group of frames classified as comprising a same static camera scene group of the different static camera scene groups; and
analyzes fewer than all frames in the group to generate context metadata for each frame in the group; and
an indexing engine that indexes each frame in the group in a database in association with the generated context metadata.

10. The video indexing system of claim 9, wherein the context metadata generation engine is further adapted to:
determine that a select frame of the sequence was captured by a moving camera, based on a classification of the frame classifier; and
responsive to the determination, generate context metadata for the select frame based on an image analysis limited to the select frame.

11. The video indexing system of claim 9, wherein the context metadata generation engine is further adapted to:
select a keyframe from the group; and
generate at least a portion of the context metadata for each frame in the group based on an analysis of the keyframe without analyzing other frames of the group.

12. The video indexing system of claim 11, wherein the context metadata generation engine is adapted to:
generate a region of interest (ROI) mask for the keyframe of the group;
apply the ROI mask to each frame in the group; and
omit an area defined by the ROI mask from subsequent processing operations performed on the frames of the group.

13. The video indexing system of claim 11, wherein the context metadata includes descriptors for multiple objects present in the keyframe.

14. The video indexing system of claim 13, wherein the context metadata includes a scene label generated based on the descriptors generated for the keyframe.

15. The video indexing system of claim 9, further comprising:
an object tracker that executes logic to track movements of objects throughout multiple frames of the group, the logic being adapted to implement constraints that assume a fixed frame of reference for a camera capturing the video.

16. One or more tangible computer-readable storage media encoding computer-executable instructions for executing a computer processes comprising:
classifying video frames within a sequence into different static camera scene groups;

generating context metadata for each frame in a group of the different static camera scene groups, the context metadata being generated based on an analysis of fewer than all frames in the group; and indexing each frame in the group in a database in association with the generated context metadata.

17. The one or more tangible computer-readable storage media of claim 16, wherein generating the context metadata further comprises:

selecting a keyframe from the group; and generating at least a portion of the context metadata for each frame in the group based on an analysis of the keyframe without analyzing other frames of the group.

18. The one or more tangible computer-readable storage media of claim 16, wherein the computer process further comprises:

determining that a select frame of the sequence was captured by a moving camera;

responsive to the determination, generating context metadata for the select frame based on an image analysis limited to the select frame.

19. The one or more tangible computer-readable storage media of claim 17, wherein the computer process further comprises:

generating a region of interest (ROI) mask for the keyframe of the group;

applying the ROI mask to each frame in the group; and omitting an area defined by the ROI mask from subsequent processing operations performed on the frames of the group.

* * * * *